Sept. 1, 1964 C. W. BUSK 3,146,651
FEEDING AND DIE CUTTING MACHINE
Filed Aug. 10, 1960 3 Sheets-Sheet 1
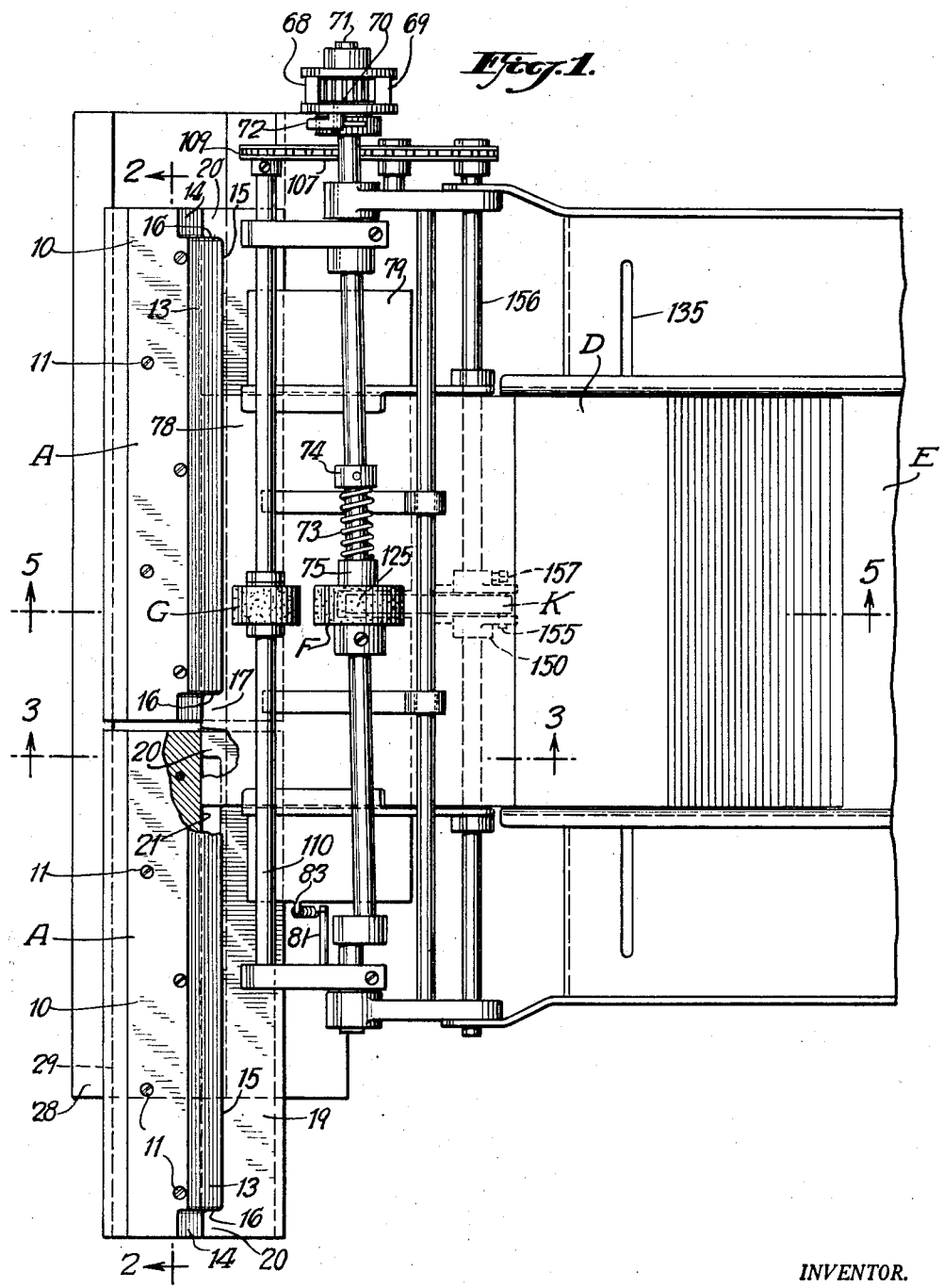
INVENTOR.
CHARLES W. BUSK.
BY
ATTORNEY.

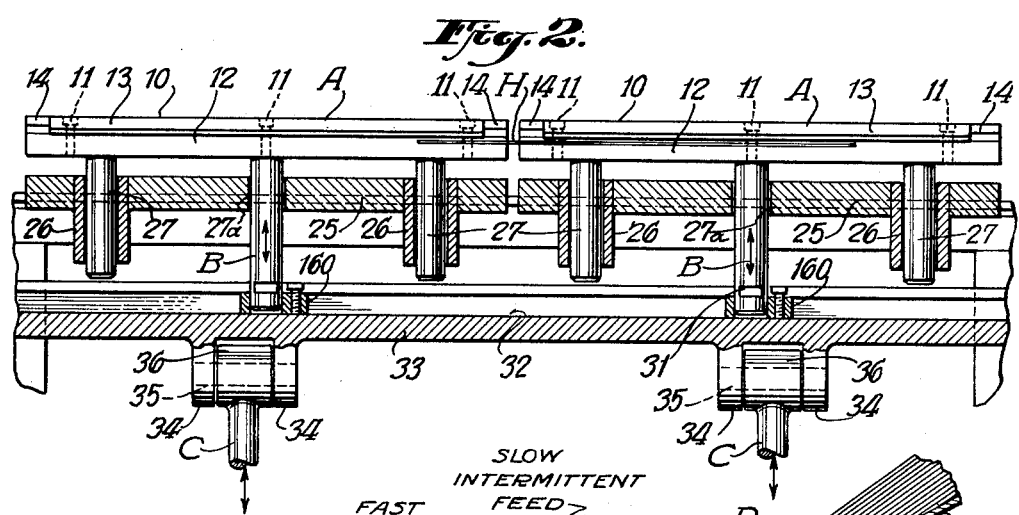
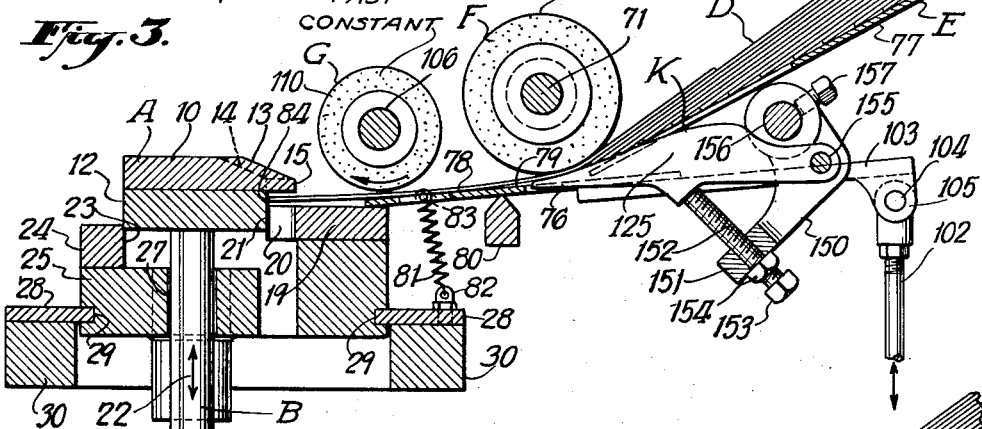
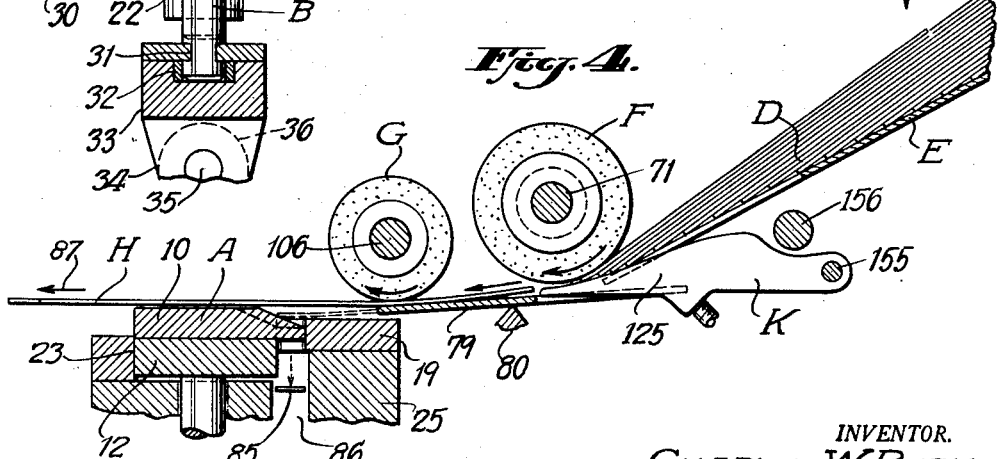

Sept. 1, 1964  C. W. BUSK  3,146,651
FEEDING AND DIE CUTTING MACHINE
Filed Aug. 10, 1960  3 Sheets-Sheet 3
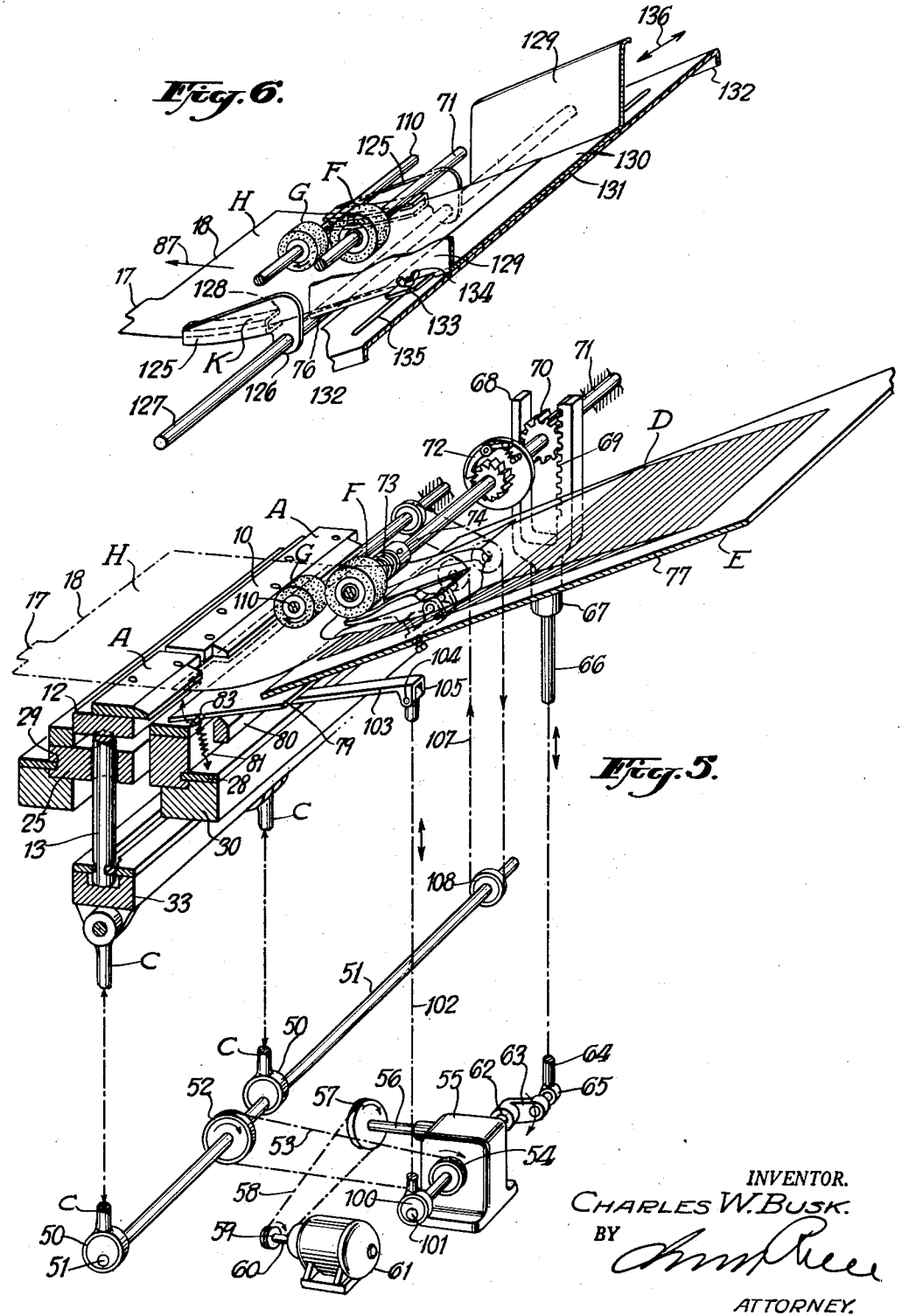
INVENTOR.
CHARLES W. BUSK.
BY
ATTORNEY.

United States Patent Office 3,146,651
Patented Sept. 1, 1964

3,146,651
FEEDING AND DIE CUTTING MACHINE
Charles W. Busk, Oyster Bay, N.Y.
(153—13 Northern Blvd., Flushing, N.Y.)
Filed Aug. 10, 1960, Ser. No. 48,631
4 Claims. (Cl. 83—262)

The present invention relates to a feeding and die cutting machine and it particularly relates to a feeding and die cutting machine which will handle various types of sheet materials.

The invention will particularly be described in its application to the die cutting of relatively stiff sheets of paper as for forming index tabs or projections thereon but it is to be particularly understood that it has a much broader application to the feeding and die cutting of various types of sheet materials.

It is among the objects of the present invention to provide a novel compact machine for substantially automatically feeding and die cutting sheets of paper which may be readily adjusted and which will have a high speed of production and which will not be readily subject to derangement or require excessive servicing.

Another object is to provide a high speed feeding and die cutting machine particularly useful for handling and processing sheet paper materials which will result in substantially automatic operation with a minimum of manual labor or supervision and which will produce at low cost.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory according to one embodiment of the present invention to provide a novel high speed machine in which the sheets of paper will be fed one at a time against a reciprocating die cutting device which is then actuated to die cut the edge of the paper following which the die is removed so that the processed or die cut sheet may be passed upon its way.

In the preferred form the sheets are fed one at a time from a hopper or stack and then are transferred by a wheel or belt feed against the die under the cutting edge thereof. Then the die is actuated to die cut the edge to form a suitable tab or tabs thereon. As soon as the die cutting has been completed the dies will be moved out of the path of the die cut sheet so that the sheet of paper may then be transferred to a collecting stack or bin following which the die will again be positioned where it will intercept the next sheet of paper.

In one form of the invention two vertically reciprocating dies are utilized which are movable or adjustable so as to provide the necessary spacing and shaping of the die cut tabs on the edge of the sheet of paper.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIGURE 1 is a top plan view of one form of the preferred feeding and die cutting machine according to the present invention.

FIG. 2 is a transverse vertical sectional view taken upon the line 2—2 of FIG. 1.

FIG. 3 is a transverse vertical sectional view taken upon the line 3—3 of FIG. 1.

FIG. 4 is a transverse seectional view similar to FIG. 3 showing the die in lower position with the die cut sheet passing thereover.

FIG. 5 is a top diagrammatic perspective view showing the intermittent drive arrangement and the various driving arrangements.

FIG. 6 is a fragmentary top perspective view showing the side adjustment guides to regulate the feed down to and by the die cutting position.

Referring to FIGS. 1 to 5 there are shown two adjustable die cutting assemblies A provided with the vertical drive arrangement, the drive shafts B and drive arrangements C (see FIGS. 2, 3 and 5).

The stack of sheets D are fed from a hopper or supply source E one at a time under the intermittent feed roller F and they are then fed against the die A in its upper position as shown in FIG. 3.

The die is then actuated to move downwardly from the position of FIG. 3 to the position of FIG. 4 and the die cut sheet H is then caused to pass over the die under the action of the feed roller G.

Referring specifically to FIGS. 1 to 4 the two die members A each have a top plate 10 which is mounted by by the screws or bolts 11 on the base plate 12.

The forward or cutting portion has an oblique nose portion 13 which is recessed as indicated at 14 and has a forward straight vertical end portion 15.

As indicated the ends of the top plate 10 terminate at 16 inside of the base plate 12 and they project forwardly beyond the base plate 12 so that they will form a tab 17 projecting forwardly from the edge 18 of the die cut card H (see particularly FIGS. 5 and 6).

The edge portions 16 as shown in FIG. 1 are mounted at their corners so as to form the desired rounded edge shape of the tabs 17 of FIGS. 5 and 6 and the under die 19 has a forward edge portion 20 which is shaped to conform to the die cutting edge of the bevel portion 13 of the upper die structure or assembly A.

The lower plate 12 will slide vertically as indicated by the double arrow 22 between the faces 21 and 23 of the lower structure 24 which is mounted on the plate 25.

The plate 25 carries the depending sleeves 26 which form guide bars for the depending guide rods 27 extending downwardly from the lower plate 12 of the die assembly.

The drive rod B on the other hand also is mounted on the lower plate 12 but it extends loosely through the opening 27 in the plate 25 without contacting the sides of the opening 27. The plate 25 is held in position by the plate member 28 which projects in the groove 29 in the side thereof and which is in turn mounted on the base structure 30.

The lower end of the drive rod B has a slotted connection at 31 to the socket 32 at the top cross head 33 connected to the clevis eyes 34. The clevis eyes 34 fit on the shaft 35 and they embrace the eye 36 at the top of the drive shaft C.

The slotted arrangement 32 permits the die members A together with the lower die structure 19–20 to be moved laterally to change the position and number as well as width of the tabs 17.

The drive arrangement is best indicated in FIG. 5 and it will be noted that the shaft C extends down to the eccentrics 50 which are driven by the shaft 51 through the belt pulley 52. The pulley 52 has a chain or belt 53 leading to the pulley 54 in the speed reduction box 55. The gearing in the speed reduction box 55 is driven through the shaft 56 having the pulley 57 which is driven through the belt or chain from the end pulley or sprocket 59 on the motor shaft 60.

The drive motor 61 may be mounted on the base of the base of the structure or upon the floor.

At the other end of the speed reduction box is a shaft 62 (see FIG. 5) which drives the arm 63 and the rod or linkage 64 through the eye 65.

The rod or linkage 64 is connected to the shaft 66 which is threaded into the base 67 of the fork member 68 having the internal rack arrangement 69. This rack arrangement 69 will mesh with the pinion 70 on the shaft 71 and will drive said shaft intermittently.

The shaft is provided with the latch and pawl arrangement 72 to hold it against retrograde movement and it is also provided with the clutch spring 73 which reacts between the collar 74 and the hub 75 of the feed wheel F. The feed wheel F will be positioned closely adjacent the lower forward end 76 of the side guide structure K.

The side guide structure together with the slow intermittent feed wheel F will only permit one card to pass at a time from the stack D as they feed down over the floor 77 of the chute or hopper E.

As shown in FIG. 3 and 4 one sheet at a time will feed down as indicated at 78 over the oscillating plate 79 which is mounted to rock on the pivot 80. This rocking plate will be biased downwardly by the spring 81 which is connected at its lower end to the eye 82 on the plate 28 and at its upper end to the stud 83 on the side of the plate 79.

The sheet 78 which is released from the stack D as shown in FIG. 3 will first abut at its forward edge the wall 84 under the projecting nose or lip 13 of the die assembly A. This will stop forward motion of the sheet 78. As soon as this occurs the die A will then move downwardly from the position of FIG. 3 to the position of FIG. 4, with the result that a die cut portion 85 (see FIG. 4) is ejected downwardly through the space 86 in FIG. 4 and the sheet H which has been die cut will then be shot over the top face of the die assembly A as indicated by the arrow 87.

This will be accomplished by the feed roller G which will be placed in contact with the die cut sheet so that it will be moved quickly as soon as the die A is lowered to clear its path as indicated at 87 in FIG. 4.

The eccentric 100 on the shaft 101 from the reduction box 55 as shown in FIG. 5 will have an extension link or shaft 102 leading up to the oscillating arm 103 which is connected thereto by means of the pivot stud 104 and the eye 105 (see FIG. 3). This bar 103 will be connected to the plate 79 and will oscillate the plate so that the die cut sheet 78 will meet the roller G and be shot out over the die assembly A as indicated by the arrow 87 in FIG. 4.

The shaft 106 for the forward feed roller G will be driven continuously and at a high sped as compared to the intermittent feed roller F and it is driven through the belt or chain 107 (see FIG. 5) from the pulley or sprocket 108 on the shaft 51. This belt or pulley 107 connects to the upper pulley 109 which drives the shaft 110 carrying the feed roller G.

The guide arrangement is shown best in FIG. 6 and there are the side guide plates 125 which are pivotally mounted by the ears 126 on the guide rod 127. These guide plates 125 have the side or channel members 128 to guide the sheet in its passage to die cutting position as shown in FIG. 6. Above the side guide plates 125 are the side plates 129 which are connected by the bottom plate 130 and rest upon the forward edge 131 of the chute having the downturned side flange 132 (see FIG. 6).

The plates 129 are adjustable by means of the flanges 133 and the wing nuts 134 which slide in the slots 135 and are movable laterally as indicated in 136.

The side plate members of the guide structure K as shown in FIG. 3 may be adjusted on the bracket 150 having the lower eyes 151 with an adjusting bolt 152 having a head 153 and locked in position are the lock nut 154.

The guide structure K is pivotally mounted at 155 on the bracket 150. The bracket 150 is carried on the shaft 156 and is fixed thereon by the set screw 157.

Referring to FIG. 2, it is indicated that the loosening of the screws or bolts 160 would permit lateral adjustment of the die assemblies along the base to vary the position and width of the tab 17 and the number of tabs which may be utilized.

In operation there are a stack of sheets D on the member E and they are fed one at a time past the intermittent feed roll F against the stop position as indicated at 84 in FIG. 3.

Then the dies is moved downwardly from the position of FIG. 3 to the position of FIG. 4 and the die cut sheet is then elevated against the rapidly turning feed roller G and is shot out as is indicated by the arrow 87. This will result in a very rapid die cutting and feed of the sheets D one after another without attention and without manual intervention. There will be practically no hand labor required and it will not be necessary for each sheet to be positioned by the operator. The positioning of the tab, the width of the tab and its location on the edge of the sheet are automatically determined without attention of the operator.

The sheets are fed one at a time automatically to die cut position, are stopped against the die assembly A and then are cleared as the die assembly A descends below the path of the sheet and permits passage of the die cut sheet H to a suitable stack or receiver.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A machine for feeding and die cutting sheet materials particularly for forming tab edges on index cards and sheeting which comprises a machine support structure providing a feed path, means to supply sheet materials at the inlet end of said feed path, feed means for feeding said sheet materials one at a time along said path, a female die located beneath said path at the outlet end of said path, a male die including a die cutting component and a sheet material stop abutment in juxtaposition to the female die, said male die being reciprocable from a raised position wherein its die cutting component lies above said path and in a position to cooperate with the female die when the male die is moved downwardly to die cut the sheet material, said stop abutment engaging the sheet material when the male die is in its raised position, drive means to move the male die to a position wherein it lies completely below said path, whereby the die cut material travels over the upper surface of the male die in the direction of the path.

2. The machine of claim 1, said male die having a beveled face sloping upwardly away from the sheet material as it is fed toward the outlet end.

3. The machine of claim 1, said male die including two die cutting elements and means to adjust the two elements toward and away from one another to give a desired width and shape to the tab.

4. The machine of claim 1, said feed means including a slow intermittent feed roller to feed the sheet materials one at a time to and against the abutment before die cutting and a fast feed roller to feed the sheet materials over the upper surface of the male die after die cutting.

References Cited in the file of this patent

UNITED STATES PATENTS 2,874,775    Muller _____ Feb. 24, 1959

FOREIGN PATENTS 579,408    Great Britain _____ Aug. 6, 1946